United States Patent [19]

Podlas

[11] 4,183,765

[45] Jan. 15, 1980

[54] METHOD OF INCREASING VISCOSITY OF HYDROXYALKYL CELLULOSE SOLUTIONS

[75] Inventor: Thomas J. Podlas, Newark, Del.

[73] Assignee: Hercules Incorporated, Wilmington, Del.

[21] Appl. No.: 925,005

[22] Filed: Jul. 14, 1978

[51] Int. Cl.$^2$ ............................................. C08L 1/26
[52] U.S. Cl. ................................. 106/187; 106/197 R
[58] Field of Search ........................................ 106/187

[56] References Cited

U.S. PATENT DOCUMENTS

| | | | |
|---|---|---|---|
| 2,555,265 | 5/1951 | Bergman | 252/8.5 C |
| 3,953,336 | 4/1976 | Daigle | 252/8.5 C |

*Primary Examiner*—Theodore Morris
*Attorney, Agent, or Firm*—William S. Alexander

[57] ABSTRACT

Viscosity of hydroxyalkyl cellulose solutions is increased by treatment with benzoquinone under controlled conditions of pH.

4 Claims, No Drawings

METHOD OF INCREASING VISCOSITY OF HYDROXYALKYL CELLULOSE SOLUTIONS

This invention relates to the viscosity enhancement and crosslinking of cellulose derivatives. More specifically, it relates to the use of specific aromatic ketones to increase the viscosity of hydroxyalkyl cellulose ethers in aqueous solution.

The hydroxyalkyl ethers of cellulose are used as viscosity building ingredients in aqueous solution in a wide range of applications. These ethers are available in low, medium, high and even ultra-high molecular weight grades. (These are conventionally referred to as low, medium, high, and ultra-high viscosity materials, referring to the viscosity of their aqueous solutions.) There are applications, however, for the hydroxyalkyl cellulose ethers where even the ultra-high viscosity grades are not high enough to accomplish the end desired. In some other applications, it is desirable to use a material of a low viscosity which is pumpable but which can develop very high viscosity or even form a gel after it has been transferred to the location where it is to accomplish the purpose intended for it. A method of increasing the viscosity or crosslinking a hydroxyalkyl cellulose ether is much to be desired in such cases.

To date, however, practical methods have not been known to effect viscosity enhancement of hydroxyalkyl ethers of cellulose in aqueous solution. U.S. Pat. No. 3,378,070 teaches crosslinking of hydroxyethyl cellulose with certain metal ions, but is concerned with the formation of tough, rubbery gels. U.S. Pat. No. 4,040,484 and U.S. Pat. No. 4,068,720 teach treating cellulose ethers with polyvalent, reducible metal ions and reducing agents capable of reducing these ions in situ to a valence state at which they can cause crosslinking to take place. These latter patents purport to be applicable to all cellulose ethers but are demonstrated only for the ionic species.

In accordance with this invention, it has been found that water-soluble hydroxyalkyl ethers of cellulose can readily be increased in viscosity in aqueous solution with p-benzoquinone to form high viscosity solutions or even gels. In accordance with this invention, a hydroxyalkyl ether of cellulose is increased in viscosity or crosslinked by a method which comprises contacting a solution containing at least about 0.075% by weight of such ether with about 0.4 to 75% by weight, based on the weight of the ether, of benzoquinone, the solution being one having a pH greater than 6.4 after addition of the benzoquinone and having sufficient buffering capacity to retain a pH greater than 6.4 for at least 24 hours after benzoquinone is added thereto.

The method of the invention is applicable to water-soluble cellulose ethers generally, such as, for example, methyl cellulose, carboxyalkyl cellulose and the hydroxyalkyl celluloses. It is particularly useful with the hydroxyalkyl celluloses which have a relatively high concentration of unsubstituted hydroxyl groups. Thus hydroxyethyl cellulose, hydroxypropyl cellulose, methyl hydroxypropyl cellulose, carboxymethyl hydroxyethyl cellulose, dihydroxypropyl cellulose and ethyl hydroxyethyl cellulose, by way of example, are readily modified by the method of the invention.

The benzoquinone can be brought into contact with the cellulose ether after the ether is dissolved in the water. Either particulate benzoquinone can be added to the solution or a prepared solution can be added. Alternatively the cellulose ether can be added to a solution of the benzoquinone. For greatest ease of handling, it is also desirable on some occasions that the benzoquinone and hydroxyalkyl cellulose be dry blended in the appropriate proportions prior to incorporation of either component into the water.

In increasing the viscosity with benzoquinone according to this invention, the pH of the solution is the most critical factor. Normally, the pH of an aqueous solution of a commercial cellulose ether will be at least slightly basic regardless of the pH of the water used as the solvent. In the presence of the benzoquinone, the pH immediately begins to decrease toward the acidic range. At acid pH levels, the benzoquinone may cause a decrease in the viscosity of the cellulose ether solution. If the pH decrease is excessive, this effect is greater than the viscosity increasing effect and no measurable viscosity increase takes place. By observation, it has been established that the pH decrease is excessive if the pH of the cellulose ether solution is less than about 6.4 after 24 hours in the presence of the benzoquinone.

It is preferred to use water which initially is of basic pH or near neutral to carry out the invention. Normal tap water or ground water which is neutral or slightly basic is usually sufficiently buffered that its pH will remain within the operative range. If it does not, it can be buffered artificially via addition of an electrolyte, preferably an alkali metal salt such as sodium carbonate or sodium bicarbonate. Likewise, if the original pH of the water is not within the basic range, the water can be made basic by addition of caustic, such as sodium or potassium hydroxide or by the addition of a basic electrolyte such as potassium or sodium carbonate. Such an acidic water will then be usable in the invention if there is sufficient buffering to assure that the previously defined pH condition is met.

The concentration of benzoquinone required to effect the viscosity increase or crosslinking varies to some extent with the cellulose ether being treated, but more so with the concentration of the ether in solution. As the concentration of ether in solution decreases, the amount of benzoquinone required increases. Thus, for a concentration of ether of 1% by weight based on the weight of polymer the concentration of benzoquinone required is about 0.4% by weight of the ether. When the ether concentration is about 0.075% by weight, appreciable viscosity increase or crosslinking based on the weight of the polymer requires about 70% benzoquinone by weight of the ether.

With respect to type of cellulose ether being modified, the difference in required concentration apparently arises from the differences in available hydroxyl groups remaining on the ether. Thus, those ethers such as carboxymethyl cellulose, methyl cellulose and methyl hydroxypropyl cellulose which have a non-hydroxylic substituent are more difficult and need a higher concentration of benzoquinone to modify them.

It has also been observed that the rate of viscosity increase can be retarded by the presence of formaldehyde. Thus, a means is provided of further control over viscosity increase or gelling rate. The required formaldehyde concentraion which will give noticeable retardation is about 1 to 6 parts of formaldehyde per part of benzoquinone.

The invention is illustrated in the following example. Parts and percentages are by weight unless otherwise indicated. Viscosities were measured using a Brookfield Viscometer at 60 RPM, #2 spindle.

EXAMPLE 1

A solution was prepared of 0.25% high molecular weight hydroxyethyl cellulose (HEC) having M.S. of 2.5 (i.e., 2.5 moles of hydroxyethyl substitution per cellulosic anhydroglucose unit) in well water having a pH of 8.3. Upon complete dissolution of the HEC, this solution had a viscosity of 31 cps.

To 100 ml. aliquots of the HEC solution was added, respectively, 5 ml. and 10 ml. of a 1% solution of technical grade benzoquinone in water. These were allowed to sit unitl gelling took place.

Periodic viscosity and pH readings showed the following:

| Benzoquinone | pH | | | Viscosity | | | | |
|---|---|---|---|---|---|---|---|---|
| Content | Immed. | 1 day | 7 days | 1 day | 3 days | 4 days | 5 days | 6 days |
| 10 ml. | 8.1 | 7.0 | 6.4 | 44 | 55 | Gel | — | — |
| 5 ml. | 8.0 | 7.2 | 6.8 | 32 | 36 | 270 | Gel | — |

The above experiments were repeated using distilled water of pH 6.9. After 24 hours, the pH had dropped to 5.0 and 5.4, respectively. After 17 days, no evidence of crosslinking was visible, the viscosity having decreased to the 6–7 cps. range for both quinone addition levels. Substantially the same pH drop resulted and no viscosity increase occurred when the pH of the distilled water was increased to 8.3 with sodium hydroxide prior to preparing the HEC solution, indicating the lack of buffering of the distilled water.

EXAMPLE 2

The experiments of Example 1 were repeated using, as a solvent, an aqueous solution of 2% sodium chloride and 0.2% calcium chloride made up in distilled water or tap (well) water. These are referred to as distilled water weak brine (DWWB) and tap water weak brine (TWWB), respectively.

| Example | | ml. | pH | | Viscosity | | | | |
|---|---|---|---|---|---|---|---|---|---|
| No. | Solvent | Benzoquinone | Immed. | 1 day | 1 day | 2 days | 3 days | 4 days | 7 days |
| 2a | TWWB | 5 | 8.0 | 6.7 | 75 | gel | — | — | — |
| 2b | TWWB | 10 | 7.9 | 6.5 | 166 | gel | — | — | — |
| 2c | DWWB | 5 | 6.6 | 5.8 | 27 | 27 | 27 | 27 | 30 |
| 2d | DWWB | 10 | 6.4 | 5.4 | 24 | 24 | 25 | 24 | 26 |

The pH of the solvents was adjusted, in the case of the TWWB, to 6.8 with nitric acid and in the case of DWWB to 7.9 with sodium hydroxide. The following viscosity profile was found:

| Example | | ml. | pH | | Viscosity | | | | |
|---|---|---|---|---|---|---|---|---|---|
| No. | Solvent | Benzoquinone | Immed. | 1 day | 1 day | 2 days | 3 days | 4 days | 7 days |
| 2e | TWWB | 5 | 7.7 | 6.6 | 35 | 100 | gel | — | — |
| 2f | TWWB | 10 | 7.5 | 6.5 | 39 | 150 | gel | — | — |
| 2g | DWWB | 5 | 6.9 | 6.0 | 29 | 27 | 30 | 29 | 34 |
| 2h | DWWB | 10 | 6.7 | 5.6 | 25 | 25 | 26 | 25 | 29 |

Once again, the less buffered distilled water brine solution exhibited far less viscosity increase than did the well water, regardless of pH adjustments. It was noted, however, that the DWWB adjusted to pH 7.9 did exhibit measurable gain after 22 days.

EXAMPLE 3

Solutions of 0.25% high molecular weight HEC were prepared in TWWB using water from Examples 1 and 2 and two other sources separated by at least 5 miles in the Wilmington, Delaware area. pH readings on these specimens were as follows:

(I) 8.3
(II) 7.0
(III) 6.3

The initial viscosity of the HEC solution was 34 cps. in each case. To each was added 20% benzoquinone based on HEC. Viscosity and pH characteristics at various intervals were:

| Example | Water | | pH | | | Viscosity | | |
|---|---|---|---|---|---|---|---|---|
| No. | Source | Immed. | 1 day | 2 days | 6 days | 1 day | 2 days | 6 days |
| 3a | I | 8.0 | 7.1 | 6.9 | — | 52 | gel | — |
| 3b | II | 7.5 | 6.8 | 6.6 | 6.2 | 30 | 38 | gel |
| 3c | III | 7.4 | 6.4 | 6.0 | 5.4 | 16 | 10 | 8 |
| The quinone level was increased from 20% to 40% based on HEC. | | | | | | | | |
| 3d | I | 7.9 | 6.9 | 6.7 | — | 265 | gel | — |
| 3e | II | 7.7 | 6.6 | 6.4 | 6.0 | 28 | 46 | gel |
| 3f | III | 7.7 | 6.2 | 5.8 | 5.1 | 17 | 15 | 15 |

On the sixth day, the pH of Example 3f was increased to 8 by the addition of sodium hydroxide. Within 1.5 hours, the viscosity had increased to 100 cps.

EXAMPLE 4

A 0.5% solution of hydroxypropyl cellulose in TWWB (pH 8.3) was prepared having an initial viscosity of 92 cps. and an initial pH of 8.1. To separate samples of this solution was added 2.5, or 10 ml., respectively, of 1% benzoquinone in distilled water. The viscosity and pH profiles of these samples were as follows:

| Example No. | ml. 1% Quinone | ml. 2% Formaldehyde | pH Immed. | pH 1 day | Viscosity 1 day | 4 days | 5 days | 6 days | 7 days | 8 days | 13 days |
|---|---|---|---|---|---|---|---|---|---|---|---|
| 4a | 2 | — | 8.0 | 7.2 | 80 | 90 | 90 | 85 | 86 | 81 | 66 |
| 4b | 5 | — | 7.9 | 7.1 | 78 | 105 | 120 | 168 | 248 | 324 | gel |
| 4c | 5 | 1.25 | 7.9 | 6.9 | 77 | 98 | 105 | 110 | 125 | 148 | 262 |
| 4d | 5 | 3.8 | 7.8 | 6.8 | 70 | 85 | 85 | 90 | 95 | 98 | 122 |
| 4e | 10 | — | 7.9 | 7.0 | 70 | 165 | 284 | gel | — | — | — |

The above experiments were repeated using plain tap water (pH 8.3). The following data were recorded: initial viscosity = 52 cps., pH = 8.0.

| | | | | | | | | | | | |
|---|---|---|---|---|---|---|---|---|---|---|---|
| 4f | 2 | — | 8.0 | 7.0 | 45 | 48 | 45 | 46 | 48 | 47 | 50 |
| 4g | 5 | — | 8.0 | 7.0 | 42 | 50 | 50 | 52 | 57 | 59 | 77 |
| 4h | 5 | 1.25 | 8.0 | 7.0 | 41 | 50 | 50 | 53 | 56 | 58 | 67 |
| 4i | 5 | 3.8 | 7.9 | 6.9 | 30 | 46 | 46 | 47 | 50 | 51 | 54 |
| 4j | 10 | — | 7.9 | 6.9 | 36 | 50 | 56 | 68 | 85 | 144 | gel |

EXAMPLE 5

A dry blend of one half part of benzoquinone and 1.25 parts of hydroxyethyl cellulose having M.S. of 2.5 was prepared and mixed. This was added to 500 ml. of tap water having pH of 8.3 and stirred for 30 minutes. The pH, measured after 30 minutes stirring, was 7.9. The viscosity of this solution, measured after 30 minutes stirring, was 36 cps.; after 1.5 hours, it was 73 cps.; after 24 hours, the solution was gelled. The pH after 24 hours was 7.2.

What I claim and desire to protect by Letters Patent is:

1. A method of increasing the viscosity of an aqueous solution of a hydroxyalkyl ether of cellulose which comprises contacting a solution containing at least about 0.075% by weight of said ether with about 0.4 to 75% by weight, based on the ether, of benzoquinone, said solution having a pH greater than 6.4 after addition of the benzoquinone and having sufficient buffering capacity to retain a pH greater than 6.4 for at least 24 hours following addition of benzoquinone thereto.

2. The method of claim 1 wherein the hydroxyalkyl ether of cellulose is hydroxyethyl cellulose.

3. The method of claim 1 wherein the hydroxyalkyl ether of cellulose is hydroxypropyl cellulose.

4. A dry blend of a hydroxyalkyl ether of cellulose and about 0.4 to 75% by weight, based on the weight of said ether, of benzoquinone.

* * * * *